(12) United States Patent
Topholm et al.

(10) Patent No.: US 8,861,762 B2
(45) Date of Patent: Oct. 14, 2014

(54) HEARING AID AND AN EAR PIECE FOR A HEARING AID

(71) Applicant: Widex A/S, Lynge (DK)

(72) Inventors: Jan Topholm, Holte (DK); Klaus Henrik Vaarbroe, Skovlunde (DK); Christian Bohl Espersen, Maalov (DK); Klavs Richard Skafte, Greve (DK); Christian Pedersen Kreipke, Kastrup (DK)

(73) Assignee: Widex A/S, Lynge (DK)

( * ) Notice: Subject to any disclaimer, the term of this patent is extended or adjusted under 35 U.S.C. 154(b) by 0 days.

(21) Appl. No.: 13/671,977

(22) Filed: Nov. 8, 2012

(65) Prior Publication Data
US 2013/0064408 A1    Mar. 14, 2013

Related U.S. Application Data

(62) Division of application No. 11/970,241, filed as application No. PCT/DK2006/000361 on Jun. 20, 2006, now Pat. No. 8,331,596.

(60) Provisional application No. 60/697,383, filed on Jul. 8, 2005.

(30) Foreign Application Priority Data

Jul. 8, 2005    (DK) ................................. 2005 01017

(51) Int. Cl.
*H04R 25/00* (2006.01)
*H04R 25/02* (2006.01)

(52) U.S. Cl.
CPC ................ *H04R 25/02* (2013.01); *H04R 25/65* (2013.01); *H04R 2225/021* (2013.01); *H04R 25/652* (2013.01)

USPC ........................... 381/330; 381/328; 381/380

(58) Field of Classification Search
CPC ........ H04R 25/02; H04R 25/60; H04R 25/65; H04R 25/652; H04R 25/658; H04R 2225/021; H04R 2225/025; H04R 2225/63
USPC ......... 381/309, 322, 324, 325, 326, 328, 330, 381/373, 380, 381, 382; 181/129, 130, 135; 128/864, 867
See application file for complete search history.

(56) References Cited

U.S. PATENT DOCUMENTS

| | | | |
|---|---|---|---|
| 7,139,404 B2 * | 11/2006 | Feeley et al. | 381/330 |
| 7,844,065 B2 | 11/2010 | von Dombrowski | |
| 2003/0002700 A1 | 1/2003 | Fretz et al. | |
| 2005/0244026 A1 | 11/2005 | Nielsen et al. | |
| 2006/0159298 A1 | 7/2006 | von Dombrowski et al. | |

FOREIGN PATENT DOCUMENTS

| | | |
|---|---|---|
| EP | 1448015 A1 | 8/2004 |
| JP | 2011120590 A | 5/2001 |
| JP | 2001510976 T | 8/2001 |
| JP | 2005323363 A | 11/2005 |
| WO | 99/04601 A1 | 1/1999 |
| WO | 2005/062670 A2 | 7/2005 |
| WO | 2006/026988 A1 | 3/2006 |

OTHER PUBLICATIONS

Office Action for JP2008-519794 dated Feb. 9, 2011.

* cited by examiner

*Primary Examiner* — Huyen D Le
(74) *Attorney, Agent, or Firm* — Sughrue Mion, PLLC

(57) ABSTRACT

A behind-the-ear hearing aid (1) comprises a housing (4), an ear piece (3) and a custom earplug (2), the custom earplug being adapted to fit the ear canal of an individual hearing aid user, the ear piece having a connector for connecting with the custom earplug, the connector and the earpiece having means for snap fitting engagement and means for defining the mutual rotational orientation. The invention further provides a custom earpiece for a hearing aid.

19 Claims, 7 Drawing Sheets

HEARING AID AND AN EAR PIECE FOR A HEARING AID

RELATED APPLICATIONS

This application is a divisional of U.S. application Ser. No. 11/970,241 filed Jan. 7, 2008, now allowed, which is a continuation-in-part of application No. PCT/DK2006/000361, filed on Jun. 20, 2006, in Denmark and published as WO2007/006302 the contents of which are incorporated hereinto by reference. The present application claims priority from application no. PA 200501017 filed on Jul. 8, 2005, in Denmark, the contents of which are incorporated hereinto by reference. The present application further claims priority from U.S. 60/697,383, filed on Jul. 8, 2005, which is incorporated herein by reference.

BACKGROUND OF THE INVENTION

The present invention relates generally to hearing aids and to earplugs for a hearing aid. The invention, more particularly, relates to means integrated in an earplug for connecting a behind-the-ear hearing aid housing with the earplug.

FIELD OF THE INVENTION

Behind-the-ear (BTE) hearing aids may be used for different kinds of hearing loss. The choice of earplug depends on the type of hearing loss, as the gain of the sound that can be achieved without generating feed back depends on the distance between the microphone and the output transducer as well as on the proportion of amplified sound leaking out from the ear canal and propagating back to the microphone. For mild to moderate hearing losses normally the output transducer is positioned in the hearing aid housing, and the sound is conveyed from the output transducer through a sound tube into an earplug.

A BTE hearing aid normally comprises a hearing aid housing that may be coupled with an earpiece that is connected with an earplug. The earpiece may comprise one or more elements such as a connector adapted to be connected with the earplug, a sound tube, an output transducer, a coupling means for connecting the earpiece with a hearing aid housing, a wire for connecting an output transducer etc.

Depending on the hearing deficiency and on user preferences, different types of earplugs are used. Basically, the earplugs may be open or closed, and they may be customized or instant fit. Open or closed earplugs signify that the earplugs may or may not have a vent allowing sound to bypass the earplug from the ambient environment into the inner part of the ear canal, and the opposite way. An open earplug allows the user to hear sound directly, which may e.g. be helpful in cases where the user has a fair remaining hearing capability in part of the frequency range. An open earplug also relieves the sound level pressure generated by the users own voice, thereby defeating a potential cause of annoyance. On the other hand, an open earplug increases the feed back to the microphone and is therefore not suited for users with a profound hearing deficit, who require a high gain.

Customized earplugs are more costly than standardized earplugs as they require taking impressions of the users ear canal. Customized earplugs may have a more secure seating in the ear and they offer a better seal with the ear canal, useful for operating high gain.

The transmission of sound from the hearing aid receiver and into the ear canal depend on the type of earplug. Thus the fitting software generally must take into account the particular type of earplug, a complication in the fitting process.

Another complication is the adaptation of the sound tube to different types of earplugs.

SUMMARY OF THE INVENTION

It is an object of the invention to provide for an easier assembly of a hearing aid. It is a further object of the invention to permit easy customization of a hearing aid. It is a still further object of the invention to provide a variety of options of a hearing aid without complicating the logistics.

According to a first aspect of the present invention this and other objects are fulfilled by a BTE hearing aid comprising a housing, an ear piece and a custom earplug, the custom earplug being adapted to fit the ear canal of an individual hearing aid user, the ear piece having a connector for connecting with the custom earplug, the connector and the earpiece having means for snap fitting engagement and means for defining the mutual rotational orientation.

It is an advantage to provide a connector in the earplug since this reduces the number of components in the hearing aid, thus also providing an easier mounting of the earpiece with the earplug. The earpiece comprises a connector for cooperation with a socket of the custom earplug. The connector may be attached with a sound tube or e.g. an output transducer.

In another embodiment of the invention the connector comprises a guide. The guide secures that the earpiece and the earplug are mounted in the right position. The guide may be formed as a slit and it may be positioned in the conduit. The earplug may further comprise a stop for positioning the connector in the earplug. In a preferred embodiment the stop is a shoulder preventing the connector from being pressed too far into the earplug. Further more the connector may comprise at least one locking means that prevents the connector from being pulled out of the engagement. In a preferred embodiment the custom earplug has two locking means since this provides a more secure connection.

It is a further advantage if the custom earplug comprises staged locking means as it allows for the connector to be connected in various positions, thus it is possible to change the acoustics of the earplug only by changing the position of the connector.

The locking means are adapted to a part of the connector so that the connector can be smoothly positioned in the connector when pressed into place, and so that a larger force is needed for pulling the connector out of the interface.

In a further embodiment of the invention the custom earplug has an edge and a sound emitting opening, wherein the sound emitting opening is retracted from the edge. The positioning of the sound emitting opening influences the acoustics of the earplug. The distance between the edge and the sound emitting opening may be about 2 mm. This distance is selected to obtain acoustic properties similar to those of a standard earplug.

In another embodiment the shell is made of a photo acrylic. Photo acrylic is suitable for processing by a Stereo Lithography Apparatus (SLA), which is useful for prototyping. It is advantageous to use a thin shell thickness, such as 0.8 mm, since this allows for a large vent for open custom earplugs.

In yet another embodiment of the invention the shell has a first opening allowing sounds from the surroundings passing into the shell. Preferably the shell also has a second opening allowing sounds from the ear canal passing into the shell. The second opening may be formed by an edge on the custom part and the shell so that the second opening and first opening will be connected via the shell thus constituting a vent thereby providing a so called open earplug. It is an advantage to use an earplug with such a vent, as it is very comfortable for the hearing aid user, especially in cases where the hearing aid user has a mild to moderate hearing loss. Alternatively the second opening has a diameter between 0.5 mm and 4.0 mm thereby providing a closed earplug that is particularly useful if higher gain is wanted for the lower frequencies. In another embodiment the shell further comprises a tapered part being connected with the custom part. This is an advantage as it provides a more smooth insertion of the earplug into the ear canal of the hearing aid user.

The custom earplug may comprise a conduit. It is advantageous to use a conduit as it provides a better fixation between the connector and the earplug. In a preferred embodiment according to the second aspect of the invention the earpiece further comprises a sound tube.

In another preferred embodiment of the invention the conduit is particularly useful for connectors with dimensions varying between about 1.5 mm and 2.7 mm. This is an advantage since it allows an earpiece comprising a small sound tube, e.g. a sound tube with an outer diameter of about 1.4 mm and an inner diameter of about 0.9 mm, to be connected with the earplug.

Further embodiments appear from the dependent claims.

The invention in a second aspect provides an ear piece for a BTE hearing aid, the ear piece comprising a connector for connecting with a custom earplug, the connector and the earpiece having means for snap fitting engagement and means for defining the mutual rotational orientation.

BRIEF DESCRIPTION OF THE DRAWINGS

The invention will now be described in more detail in conjunction with several embodiments and the accompanying drawings, in which.

DETAILED DESCRIPTION OF THE DRAWINGS

Figure 1:
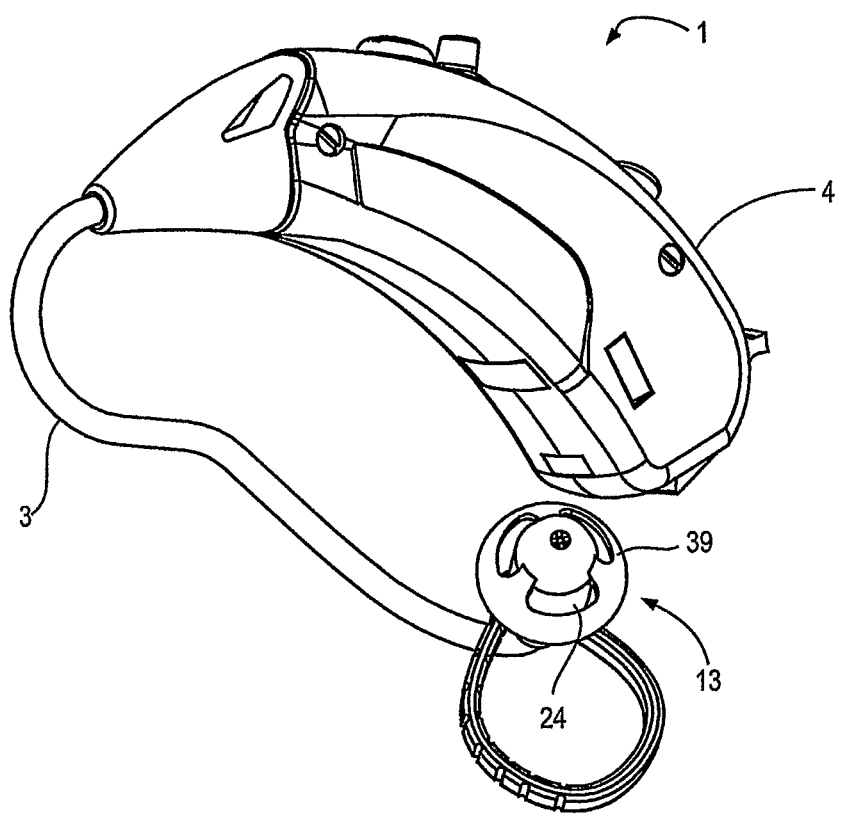
FIG. 1 is a perspective view of a BTE hearing aid with a soft open earplug.

Reference is first made to FIG. 1, which shows a hearing aid 1 comprising a soft open earplug 13, an earpiece 3 and a housing 4 containing the electronics of the hearing aid 1 including input and output transducers, signal processing means, etc. The hearing aid 1 is a BTE hearing aid of a type particularly useful for mild to moderate hearing losses.

Figure 2:
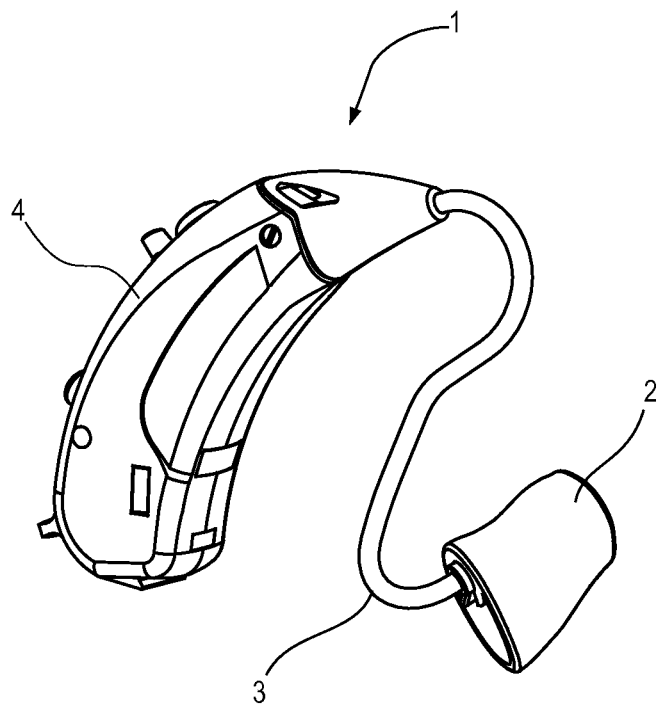
FIG. 2 is a perspective view of a BTE hearing aid with a custom open earplug.

FIG. 2 shows a hearing aid 1 with a custom open earplug 2, an earpiece 3 and a housing 4 comprising the electronics of the hearing aid 1. A custom closed earplug 33 can be made by internal modifications of the custom open earplug 2, as will be described later in association with FIG. 8.

Figure 3:
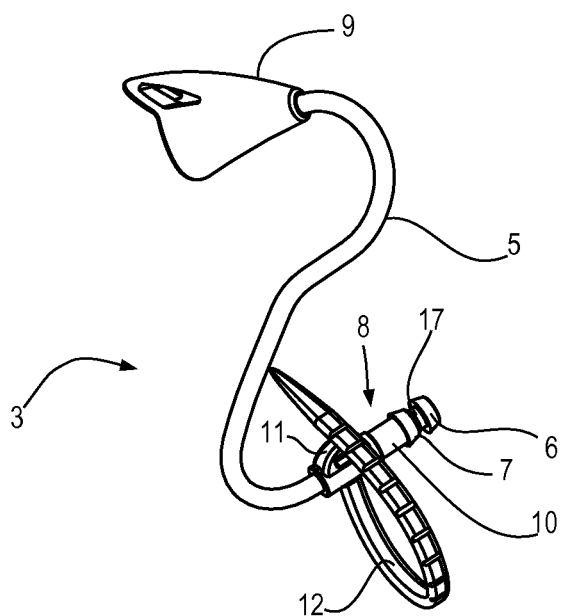
FIG. 3 illustrates an earpiece.
Figure 6:
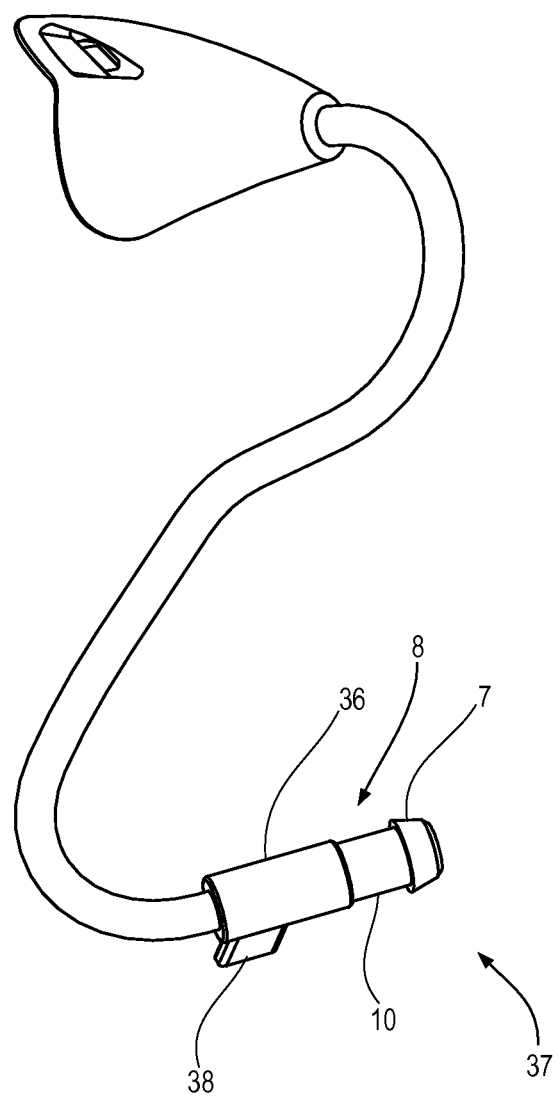
FIG. 6 illustrates a modified earpiece.

FIG. 3 shows the earpiece 3. The earpiece 3 comprises a sound tube 5, a plug or a peg 8 for connecting the sound tube 5 to the earplug 13 (FIG. 1) and a coupling means 9 for connecting the sound tube 5 to the housing 4. The sound tube is bent near one end to fit over the pinna of the user for support and it is bent at the other end to lead into the ear canal of the user. The peg 8 has a first bead 6, a second bead 7, a stub 10, a groove 17 and a retainer 11 which is adapted for receiving an end of the branch 12, the branch thereby forming a loop as illustrated in FIG. 1. The loop is adapted for resting against the tragus of the users ear for better retention of the earplug. The peg 8 further comprises a stem 36 (FIG. 6). Preferably the peg 8 is made of a flexible polyamid or another thermo plastic. Further details about the loop and about earpieces with different pegs are explained in International patent application WO2006/026988.

Figure 4:
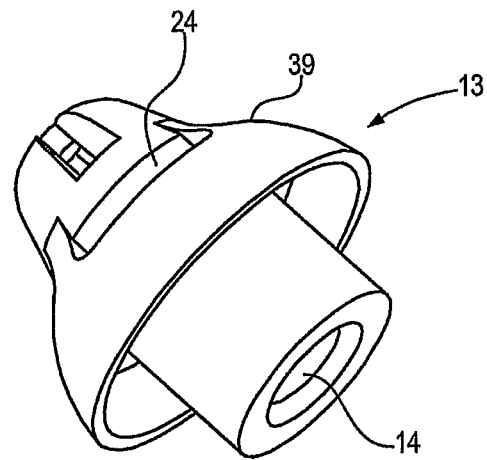
FIG. 4 illustrates a soft open earplug.
Figure 5:
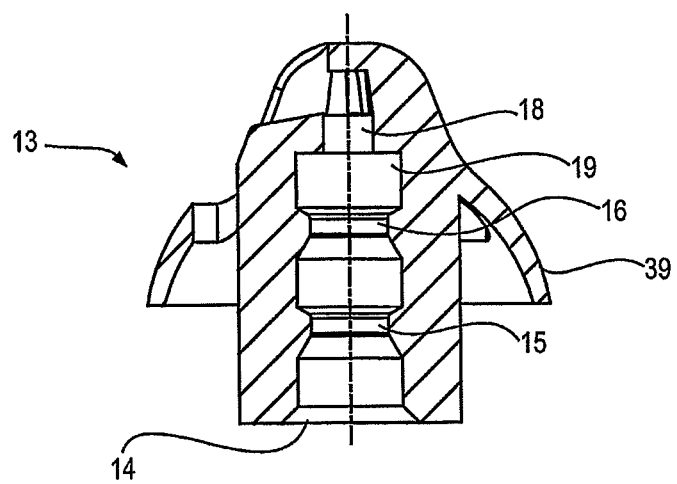
FIG. 5 illustrates a cross section of a soft open earplug.

FIG. 4 shows the open soft earplug 13 in an enlarged view. FIG. 5 shows a cross section of the soft open earplug 13 from FIG. 4. The soft open earplug comprises a generally mushroom shaped structure with a soft rim or skirt 39 and a number of openings 24 allowing sound from the surroundings to pass into the ear. For interfacing with the earpiece 3, the soft open earplug 13 comprises a central bore 14, which may have locking means. As best seen in FIG. 5, this locking means may comprise two narrowed portions, formed by annular ribs 15, 16.

The earpiece 3 and the soft open earplug 13 shown in FIG. 3 cooperate as plug and socket and may be assembled by pressing the peg 8 into the central bore 14. On inserting the peg 8 of the earpiece 3 into the central bore 14, the ribs 15, 16 will engage the groove 17 (FIG. 3) and the stub 10 in the earpiece 3. In order to prevent the peg from being inserted too far into the central bore 14, the central bore 14 has a third narrower portion 18, forming a shoulder 19 that acts as a stop, which the peg may abut when inserted into the central bore 14. The peg 8 and the soft open earplug 13 are assembled when two clicks can be distinctly felt and the peg 8 cannot be pushed in any further.

The soft earplug 13 would preferably be made of a thermoplastic elastomer, TPE or a rubber such as Silicone. Preferably the soft open earplug 13 is made of a more flexible material than the peg 8 of the earpiece 3, so that the soft earplug 13 and the peg 8 can be connected. Further more the soft earplug 13 may be manufactured in different sizes and in a soft flexible material in order to fit various shapes of ear channels.

FIG. 6 shows a modified earpiece 37. The modified earpiece 37 has been prepared starting from the standard earpiece 3 and by carrying out three basic modification steps in order to adapt the connector for interfacing with another type of earplug. The first step is to remove the first bead 6 by cutting off part of the peg in the area of the groove 17, effectively shortening the ear piece. The distance of shortening is carefully adapted to achieve specific acoustic properties of the combination of the ear piece together with a specific type of earplug. It is important to leave the second bead 7 as it is, as it functions as a coupling between an earplug and the earpiece 3. The second step is to cut off the retainer 11 so that it is completely removed and the surface is smooth. The third step is to cut off the branch 12 so to leave a residue in the form of a ridge or key 38 protruding approximately 2 mm.

In yet another embodiment of the earpiece (not shown) none of the retention beads 6, 7 are removed and the effective length of the ear piece is unaltered. It is an advantage to use two retention beads since these provide for a better fixation of an earplug 2. It is also an advantage of the earpiece 3 that the connector can be modified and thus used for various types of interfaces with different requirements to acoustic properties.

Figure 7A:
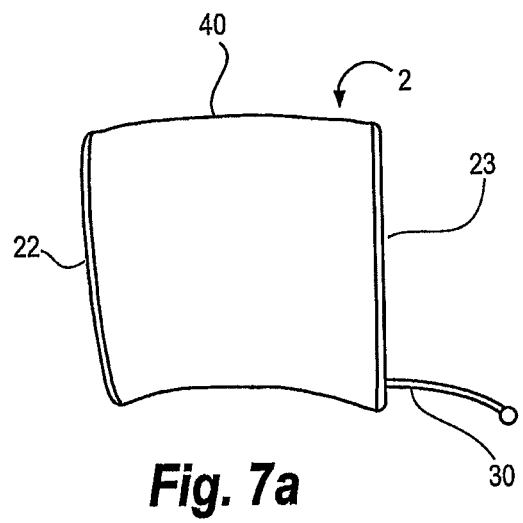
FIG. 7a illustrates a custom open earplug.

FIG. 7a shows a side view of custom open earplug 2 comprising a shell 40 with a first opening 23 out to the surroundings, a second opening 22 that points to the eardrum, referring to the position as inserted in the ear of the user, and an extraction cord 30. Like the open soft earplug 13 in FIG. 4, the open custom earplug is particularly useful for mild to moderate hearing losses.

Figure 7B:
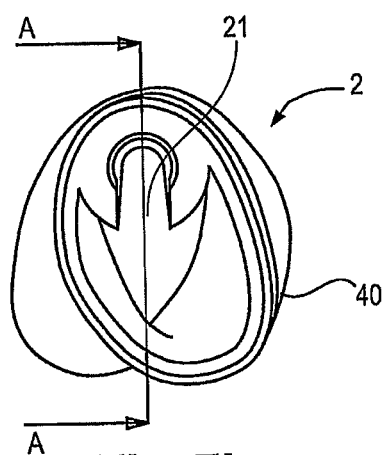
FIG. 7b illustrates a custom open earplug.
Figure 7C:
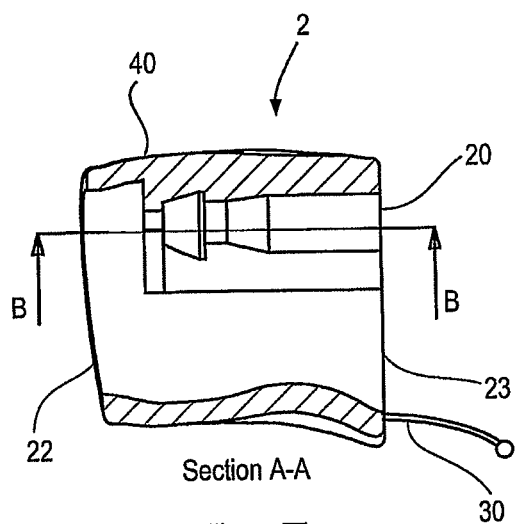
FIG. 7c illustrates the cross section A-A of the custom open earplug shown in FIG. 7b.
Figure 7D:
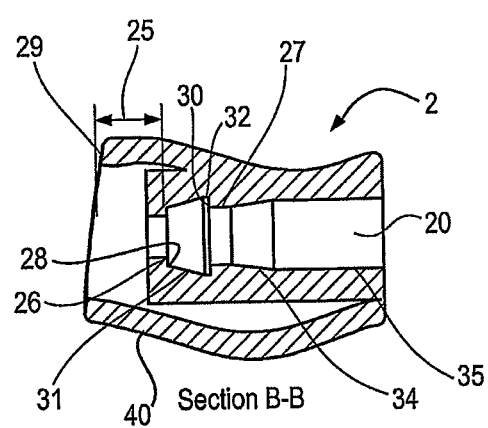
FIG. 7d illustrates the cross section B-B of the custom open earplug in FIG. 7c.

FIG. 7b shows a front view of the custom open earplug 2, and FIG. 7c and FIG. 7d show sections in FIG. 7b by the lines A-A and B-B respectively. The custom open earplug 2 comprises a socket for connecting the earplug with a connector of an earpiece 3. The custom open earplug 2 is formed as a shell comprising a socket integrated in the shell as a conduit 20. The first opening 23 and the second opening 22 are interconnected inside the shell to provide a vent that prevents occlusion and allows unaided sound from the surroundings to pass directly into the ear canal in front of the eardrum. The conduit 20 is adapted to accommodate a plug, e.g. the peg 8 in the earpiece 3 shown in FIG. 6.

In order to ensure that the earpiece 3 is connected to the custom open earplug 2 in the right rotational position, the conduit 20 has guide 21 in form of a slit 21. The slit is adapted to accommodate the key 38 (FIG. 6). In order to prevent the earpiece 3 from being inserted too far into the conduit 20, the conduit 20 has a narrower portion 26, forming a shoulder 28 that acts as a stop, which the peg 8 may abut when inserted into the conduit 20. Thus the shoulder 28 also defines an exact sound emitting position of the connector in the earplug 2.

The approximate distance 25 between the sound emitting position, in this case the shoulder 28, and the edge 29 is about 2 mm. This position as well as the length cut off from the peg are carefully selected to obtain the same acoustic characteristics for the modified ear piece in combination with the open custom earplug 2 as is obtained with the normal ear piece in combination with the soft open earplug 13 shown in FIG. 4 and FIG. 5.

The conduit 20 further has a positioning part 35, a first funnel part 34 leading the bead smoothly to a narrow part 27 and then further into a wider part 32 and then into a second funnel part 31 adapted to the shape of the bead 7. The conduit 20, which is about the same size as the stub 10 of the earpiece 3, provides a locking means by the narrow part 27. The positioning part 35 is about the same size as the stem 36 thereby providing a solid connection of the custom earplug and the earpiece 3.

Preferably the shell is made of a photo acrylic. Due to the two openings in the shell it is advantageous to use a shell thickness of about 0.8 mm since it provides a stronger shell if the shell is made of a photo acrylic. It is advantageous to use a thin shell thickness for the open custom earplug as it provides for a larger first opening and second opening, thereby providing a larger vent effect. Preferably the peg 8 of the earpiece 3 is made of a more flexible material than the custom open earplug 2, so that the custom open earplug 2 and the peg 8 can be connected.

Figure 8:
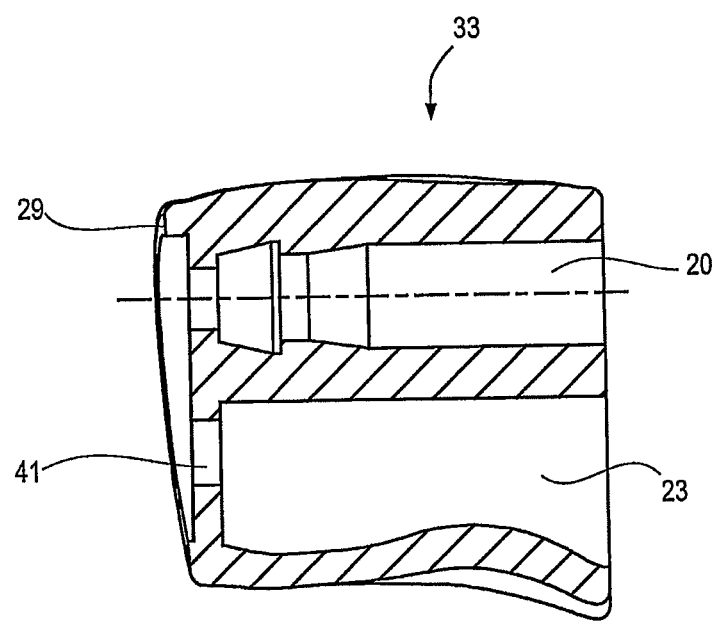
FIG. 8 illustrates a cross section of a custom closed earplug.

FIG. 8 shows a cross section of a custom closed earplug 38. The custom closed earplug is almost closed apart from an aperture 41 that provides a vent with a lumen corresponding to the area of a circle with a diameter in the range of 0.5 mm-3 mm, in some cases even more, and conduit 20 that leads the sound emitted from the sound tube to the eardrum. The custom closed earplug in FIG. 8 comprises a socket similar to the one described for the custom open earplug. In another embodiment of the custom closed earplug (not shown), the shell has a custom part and a tapered part, the tapered part closing the earplug. In this embodiment the tapered part has an outlet of the conduit 20 and it may further have an aperture 41. The reduced lumen of the aperture throttles the venting and thereby permits operating a higher gain for low frequencies. The lumen of the aperture may be tuned according to the specific acoustic properties and settings required of the hearing aid to adapt it for a particular user.

Each of the custom earplugs in FIG. 7 and FIG. 8 and the modified earpiece 3 in FIG. 6 cooperate as plug and socket and may be assembled in the following way. The ear piece 3 is held so that the key 38 points upwards and is pressed into the custom open earplug 2, 33, which is similarly held so that the slit is upwards, so that the key 38 is directed into the slit 21 in the conduit 20. The key 38 provides a visual and tactile indication of the orientation of the ear piece prior to assembly and it prevents the connector from being rotated in the earplug. The earpiece is in place when a click can be distinctly felt, that is when part of the connector is pressed in to engage the locking means of the earplug.

The shell 40 of the embodiments of custom earplugs may be designed and manufactured as described in e.g. U.S. Pat. No. B2-6,920,414 based on dimensions of the auditory canal of the hearing aid user. It is an advantage to use a CAD/CAM system since it can provide for various selections of e.g. open earplugs and closed earplugs allowing a further selection of different sizes of vents and connectors that should be part of a custom made shell.

Figure 9:
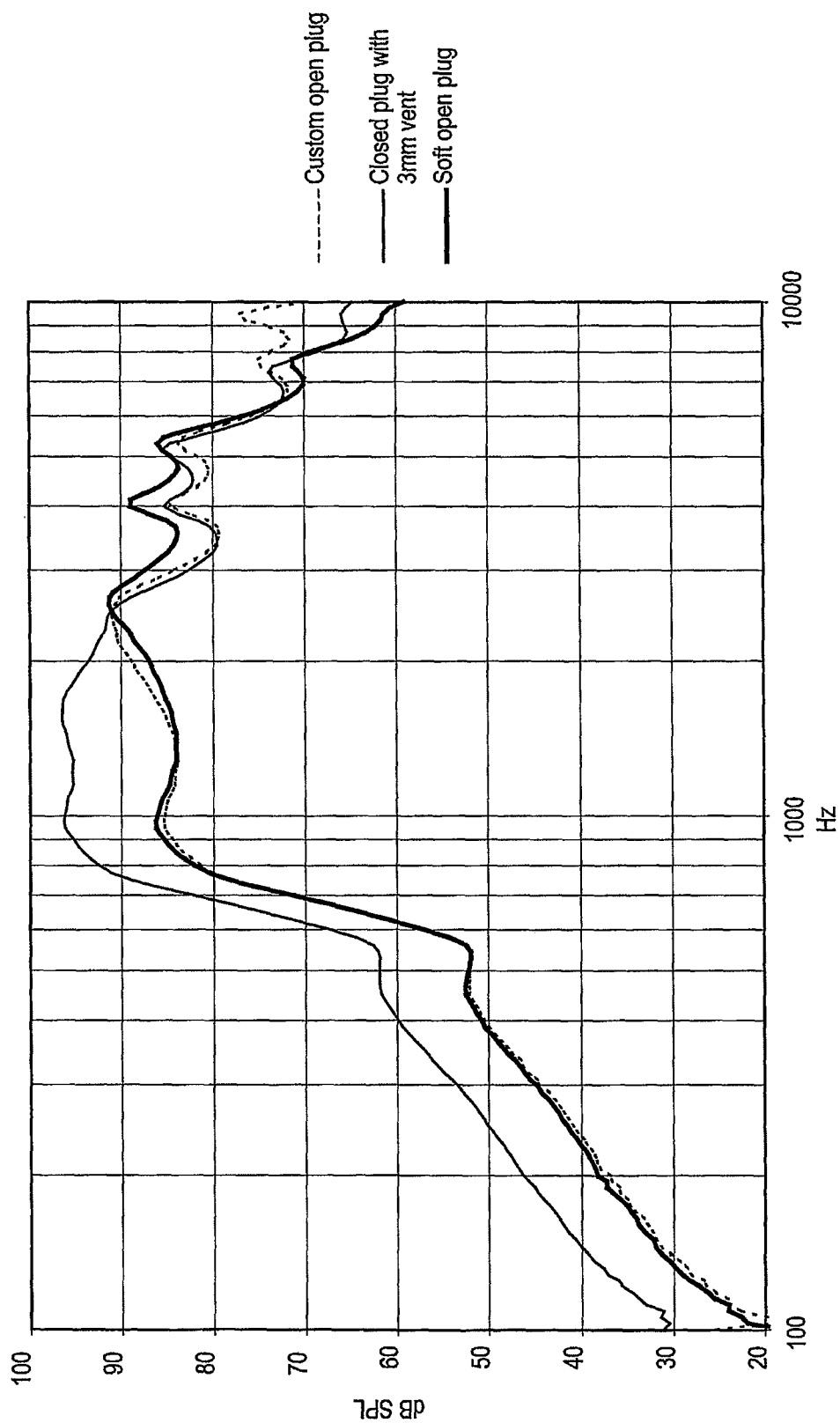
FIG. 9 illustrates a graph of the sound pressure level, SPL, for various types of earplugs.

FIG. 9 Shows the acoustic properties, i.e. the sound output developed in the ear canal, by three types of earplugs. The dotted line shows the acoustics of a custom open earplug, the solid line shows the acoustics of a soft open earplug and the broken line the acoustics of a custom closed earplug with a 3 mm vent opening. From the figure it appears that the custom open earplug as well as the soft open earplug have approximately the same acoustic properties, whereas the closed earplug with a 3 mm vent diameter, the vent being about 4 mm long, provides a louder sound at the lower frequencies. It is an advantage that the open soft earplug 13 and the custom open earplug have about the same acoustic properties since this allows for using the same fitting settings when adjusting the hearing aid for the hearing aid user. It is a further advantage that the same earpiece can be used for accommodating an open soft earplug 13 as well as a custom earplug.

We claim:

1. A hearing aid comprising a Behind The Ear housing containing an output transducer, a custom earplug having a custom part adapted to fit the ear canal of an individual hearing aid user, and having a socket, and an ear piece comprising a sound tube, coupling means for connecting the sound tube to the housing, a connector to be received into the socket by snap fitting for connecting the sound tube and the custom earplug wherein the socket and the connector has a slit and a key for ensuring that the earpiece is connected to the custom earplug in the right mutual rotational orientation.

2. The hearing aid according to claim 1, wherein the custom earplug comprises a stop limiting the insertion of the connector into the socket.

3. The hearing aid according to claim 1, wherein the custom earplug further comprises at least one locking means.

4. The hearing aid according to claim 1, wherein the custom earplug has an edge and a sound emitting opening, and wherein the sound emitting opening is retracted from the edge.

5. The hearing aid according to claim 4, wherein the distance between the edge and the sound emitting opening is about 2 mm.

6. The hearing aid according to claim 1, wherein the custom earplug comprises a shell, the shell being made of a photo acrylic and the thickness of the shell is about 0.8 mm.

7. The hearing aid according to claim 1, wherein the custom earplug comprises a shell having a first opening allowing sounds from the surroundings to pass unaided into the shell.

8. The hearing aid according to claim 7, wherein the shell further comprises a second opening allowing sounds from the ear canal into the shell.

9. The hearing aid according to claim 8, wherein the second opening is formed by an edge on the custom part, and wherein the first opening and the second opening are interconnected in the shell so that they constitute a vent.

10. The hearing aid according to claim 8, wherein second opening has a diameter between 0.5 mm and 4.0 mm.

11. The hearing aid according claim 1, wherein the custom earplug comprises a shell, and said shell further comprises a tapered part connected with the custom part.

12. The hearing aid according to claim 1, wherein said key runs at least partially in a direction parallel to a longitudinal direction of said tube.

13. The hearing aid according to claim 1, wherein said key and slit are oriented to prevent unintentional mutual rotation of said connector and custom earplug.

14. An ear piece for a hearing aid having a Behind-The-Ear housing containing an output transducer, a custom earplug having a socket and being adapted to fit the ear canal of an individual hearing aid user, said socket has a slit, wherein said ear piece comprising a sound tube, coupling means for connecting the sound tube to the housing, and a connector to be received into the socket by snap fitting for connecting the sound tube and the custom earplug, and wherein the connector has a key to fit into the slit of the socket ensuring that the earpiece is connected to the custom earplug in the right mutual rotational orientation.

15. The ear piece according to claim 14, wherein said key runs at least partially in a direction parallel to a longitudinal direction of said tube.

16. The ear piece according to claim 14, wherein said key and slit are oriented to prevent unintentional mutual rotation of said connector and custom earplug.

17. A custom earplug for a hearing aid having a Behind-The-Ear housing containing an output transducer, and an ear piece comprising a sound tube for guiding sound from the transducer to the earplug, said ear piece has a connector provided with a key, wherein said custom earplug being adapted to fit the ear canal of an individual hearing aid user, wherein said custom earplug is formed as a shell comprising a socket integrated in the shell as a conduit, and wherein said socket has a slit for receiving the key of the connector in the right mutual rotational orientation.

18. The hearing aid according to claim 17, wherein said slit runs at least partially in a direction parallel to an axial direction of said socket.

19. The hearing aid according to claim 17, wherein said key and slit are oriented to prevent unintentional mutual rotation of said connector and custom earplug.

\* \* \* \* \*